United States Patent
Toshimitsu et al.

(10) Patent No.: US 9,464,751 B2
(45) Date of Patent: Oct. 11, 2016

(54) VACUUM INSULATION MATERIAL, INSULATION CASE UNIT, AND REFRIGERATOR

(71) Applicant: SAMSUNG ELECTRONICS CO., LTD., Suwon-si, Gyeonggi-do (KR)

(72) Inventors: Tsuruga Toshimitsu, Osaka-bu (JP); Kenji Takeuchi, Osaka-bu (JP); Manabu Motegi, Osaka-bu (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 444 days.

(21) Appl. No.: 14/173,392

(22) Filed: Feb. 5, 2014

(65) Prior Publication Data

US 2014/0216100 A1    Aug. 7, 2014

(30) Foreign Application Priority Data

Feb. 6, 2013   (JP) .................................. 2013-21688
Jan. 23, 2014  (KR) ........................ 10-2014-0008174

(51) Int. Cl.
  *F16L 59/065*   (2006.01)
  *F25D 23/06*    (2006.01)

(52) U.S. Cl.
  CPC .......... *F16L 59/065* (2013.01); *F25D 23/062* (2013.01); *F25D 2201/14* (2013.01); *F25D 2500/02* (2013.01); *Y10T 428/231* (2015.01)

(58) Field of Classification Search
  CPC ........................ Y10T 428/231; F16L 59/065
  USPC ........................................................ 428/69
  See application file for complete search history.

(56) References Cited

FOREIGN PATENT DOCUMENTS

| JP | 2001-336691 | 12/2001 |
|----|-------------|---------|
| JP | 2007-155065 | 6/2007 |
| JP | 2011-58538 | 3/2011 |
| KR | 10-2012-0034511 | 4/2012 |
| KR | 10-2012-0114004 | 10/2012 |
| KR | 10-2012-0117336 | 10/2012 |

*Primary Examiner* — Alexander Thomas
(74) *Attorney, Agent, or Firm* — Staas & Halsey LLP

(57) ABSTRACT

A vacuum insulation material having bending formability while restraining reduction in a gas barrier property of a sheathing material. The vacuum insulation material includes a pouch-shaped sheathing material having a gas barrier property and a core received in the sheathing material as a spacer, the vacuum insulation material having a bendable region, a first surface, and a second surface opposite to the first surface, wherein at least one of the first and second surfaces in the bendable region is provided with a plurality of grooves extending at intervals, the grooves include a pair of outer grooves formed in the bendable region and a plurality of inner grooves formed inside the outer grooves, and an interval between each outer groove and a corresponding one of the inner grooves adjacent to each outer groove is greater than an interval between the inner grooves.

16 Claims, 10 Drawing Sheets

MAXIMUM VALUE Xmax AND MINIMUM VALUE Xmin OF GROOVE WIDTH
$X_{Max} = a-5, \leq a/2$
$X_{Min} = 0.54 \times Y (Y:GROOVE\ DEPTH)$

VACUUM INSULATION MATERIAL, INSULATION CASE UNIT, AND REFRIGERATOR

CROSS-REFERENCE TO RELATED APPLICATIONS

This application claims the benefit of Japanese Patent Application No. 2013-0021688, filed on Feb. 6, 2013 in the Japanese Patent Office and Korean Patent Application No. 10-2014-0008174, filed on Jan. 23, 2014 in Korean Intellectual Property Office, the disclosures of which are incorporated herein by reference.

BACKGROUND

1. Field

Embodiments of the present disclosure relate to a vacuum insulation material and an insulation case unit and a refrigerator using the same.

2. Description of the Related Art

Recently, energy saving devices are in high demand for protection of the environment and conservation of resources. In particular, an apparatus for warming and cooling, such as a refrigerator, a rice cooker, or a hot water supplier, requires an insulation material exhibiting excellent insulation performance to efficiently use heat and to reduce energy consumption.

A vacuum insulation material is well known as an insulation material providing excellent insulation. Japanese Patent Application Publication No. 2007-155065 discloses a vacuum insulation material manufactured by inserting a core into an encapsulator, evacuating the encapsulator, and sealing an opening of the encapsulator. Grooves are formed at the vacuum insulation material such that the vacuum insulation material be easily bent.

In addition, Japanese Patent Application Publication No. 2001-336691 discloses a vacuum insulation material including a core surrounded by an encapsulator and having grooves.

In the vacuum insulation material disclosed in Japanese Patent Application Publication No. 2007-155065, however, elongation of the encapsulator (sheathing material) is not sufficiently restrained when the insulation material is bent along the grooves. In this case, the sheathing material is damaged with the result that a gas barrier property is lowered and thus desired insulation performance may not be obtained.

In the Japanese Patent Application Publication No. 2001-336691, the grooves are formed at the vacuum insulation material such that the vacuum insulation material is bent. However, in a case in which the vacuum insulation material is bent in the shape of an R (R bending), i.e. in a case in which the vacuum insulation material is bent such that a bendable region of the vacuum insulation material forms a curve having a predetermined radius of curvature, the vacuum insulation material does not sufficiently follow the curve with the result that a plurality of wrinkles are formed at the vacuum insulation material and thus insulation performance of the vacuum insulation material may be lowered. In addition, if the number of the grooves is increased to restrain generation of wrinkles, small thickness portions are increased with the result that insulation performance of the vacuum insulation material may be lowered.

SUMMARY

It is an aspect of the present disclosure to provide a vacuum insulation material having excellent bending formability while restraining reduction in a gas barrier property of a sheathing material and an apparatus for keeping warm and cool using the same.

Additional aspects of the disclosure will be set forth in part in the description which follows and, in part, will be apparent from the description, or may be learned by practice of the disclosure.

In accordance with an aspect of the present disclosure, a vacuum insulation material includes a pouch-shaped sheathing material having a gas barrier property and a core received in the sheathing material as a spacer, the vacuum insulation material having a bendable region, a first surface, and a second surface opposite to the first surface, wherein at least one of the first and second surfaces in the bendable region is provided with a plurality of grooves extending at intervals, the grooves include a pair of outer grooves formed in the bendable region and a plurality of inner grooves formed inside the outer grooves, and an interval between each outer groove and a corresponding one of the inner grooves adjacent to each outer groove is greater than an interval between the inner grooves.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
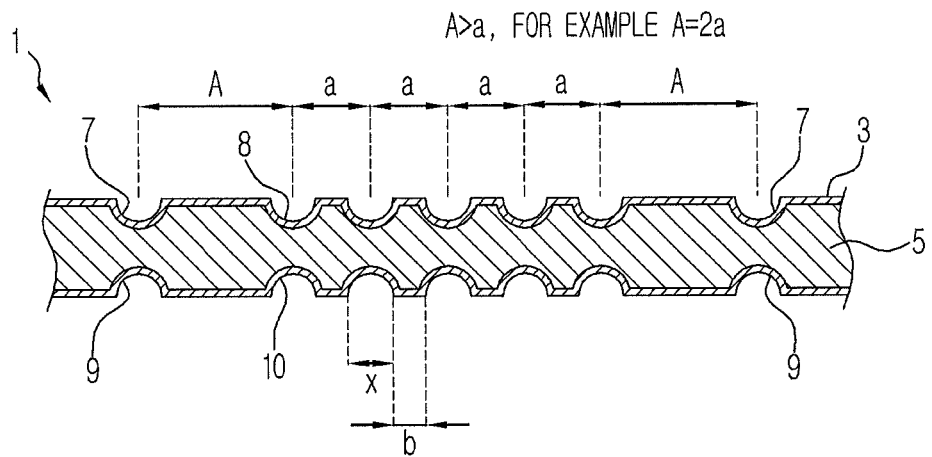
FIG. 1A is a sectional view showing a vacuum insulation material according to an embodiment of the present disclosure.

Reference will now be made in detail to the embodiments of the present disclosure, examples of which are illustrated in the accompanying drawings, wherein like reference numerals refer to like elements throughout.

In this specification, an "interval between grooves," which is a pitch between grooves, means the distance between middles of adjacent grooves. In addition, a "ratio of a groove depth to a thickness of a vacuum insulation material" means (groove depth)/(thickness of vacuum insulation material) in percent.

Construction of Vacuum Insulation Material

Figure 1B:
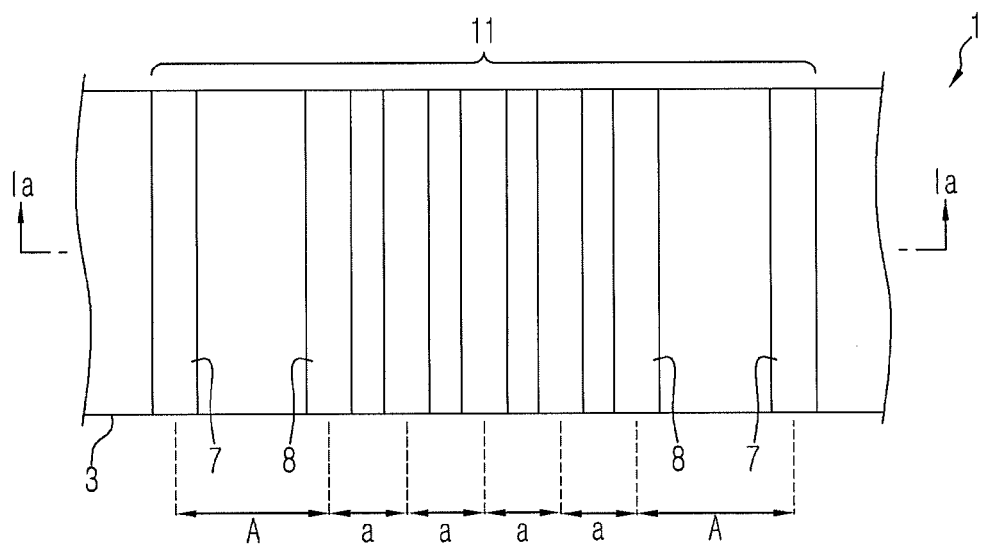
FIG. 1B is a plan view of the vacuum insulation material when viewed from above the vacuum insulation material.

FIG. 1A is a sectional view showing a vacuum insulation material according to an embodiment of the present disclosure and FIG. 1B is a plan view of the vacuum insulation material when viewed from above. For the sake of convenience, the upper part of FIG. 1A is referred to as an "upper side." In addition, in the following description, the surface of the upper side shown in FIG. 1A is referred to as a "top" (first surface) and the surface opposite to the top is referred to as a "bottom" (second surface).

As shown in FIGS. 1A and 1B, a vacuum insulation material 1 includes a bag-shaped sheathing material 3 and a core 5 received in the sheathing material 3 to function as a spacer. The interior of the sheathing material 3 is hermetically sealed such that the sheathing material 3 is under vacuum. Consequently, the vacuum insulation material 1 may provide a higher insulation effect than another insulation material, such as foamed polyurethane, while having a smaller thickness.

The vacuum insulation material 1 has a bendable region 11. At least one of the top and bottom within the bendable region 11 is provided with a plurality of grooves extending at intervals. As shown in FIGS. 1A and 1B, the grooves may be formed at both the top and bottom although the grooves may be formed at any one of the top and bottom within the bendable region 11. The bendable region 11 is a region suitable to be bent along the grooves. However, the bendable region 11 may not be actually bent. For example, as shown in FIG. 1B, the bendable region 11 may not be bent but the entirety of the vacuum insulation material 1 may be formed in the shape of a sheet.

The grooves formed at the top of the bendable region 11 include a pair of outer grooves 7 and a plurality of inner grooves 8 formed inside the outer grooves 7. The grooves formed at the bottom of the bendable region 11 include a pair of outer grooves 9 and a plurality of inner grooves 10 formed inside the outer grooves 9. The grooves may extend in parallel. The outer grooves 7 and 9 and the inner grooves 8 and 10 may have the same width and depth or may have different widths and depths within a predetermined range, which will hereinafter be described.

As shown in FIGS. 1A and 1B, an interval A between each outer groove 7 and an inner groove 8 adjacent to each outer groove 7 is greater than an interval a between the inner grooves 8. In the same manner, an interval A between each outer groove 9 and an inner groove 10 adjacent to each outer groove 9 is greater than an interval a between the inner grooves 10. In addition, in the drawings, symbol b indicates a distance between ends of adjacent inner grooves 8 and 10, which may be 5 mm or more.

Figure 1C:
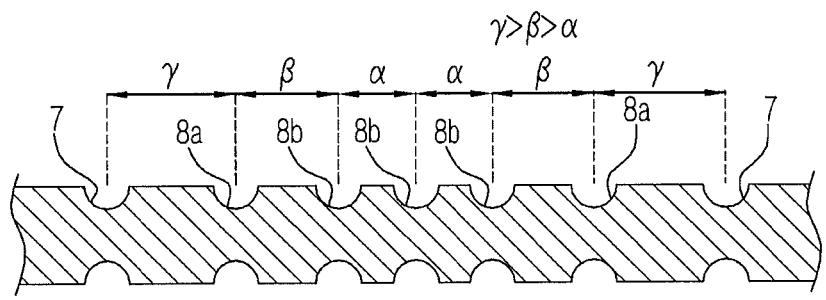
FIG. 1C is a sectional view showing a vacuum insulation material according to a modification of the embodiment of the present disclosure.

In addition, as shown in FIG. 1C, on the assumption that two outside ones of the inner grooves 8 are denoted by 8a and plural ones disposed between the groves 8a are denoted by 8b, an interval between each outer groove 7 and a corresponding groove 8a is denoted by $\gamma$, an interval between each groove 8a and an adjacent groove 8b is denoted by $\beta$, and an interval between adjacent grooves 8b is denoted by $\alpha$, the groove may be formed such that $\gamma > \beta > \alpha$. In this way, the interval between the outer grooves may greater than the interval between the inner grooves.

When the bendable region of the vacuum insulation material 1 covers an object having a curved region, the center of the curved region in the circumferential direction generally has a smaller bending radius than opposite ends (i.e. a bending start point and a bending end point) in the circumferential direction. According to the above construction, the interval between the grooves is small in a region having a small bending radius and the interval between the grooves is large in a region having a large bending radius. Consequently, the total number of the grooves is decreased to restrain deterioration of insulation and to improve shape adaptation to the curved region. As a result, the bendable region 11 is not wrinkled or folded when the bendable region 11 is bent along the grooves, thereby restraining deterioration of insulation efficiency. In addition, formation of pin holes or deterioration of gas barrier performance due to elongation of the sheathing material 3 is restrained.

In addition, in a case in which the grooves are formed at both the top and bottom of the vacuum insulation material 1, the grooves formed at the respective surfaces may be opposite to each other. In other words, when viewed from above, the outer grooves 7 and the outer grooves 9 may overlap and the outer grooves 8 and the outer grooves 10 may overlap. According to this construction, the groove depth per surface may be reduced as compared with a case in which grooves are formed only at one surface of the vacuum insulation material 1 with the result that elongation of the sheathing material 3 is reduced and thus damage to the sheathing material 3 is reduced. In addition, the sum of the groove depth at the top and the groove depth at the bottom is sufficiently increased while reducing damage to the sheathing material 3, thereby reducing bending modulus and bending strength of the bendable region 11 and thus improving bending formability.

Figure 2A:
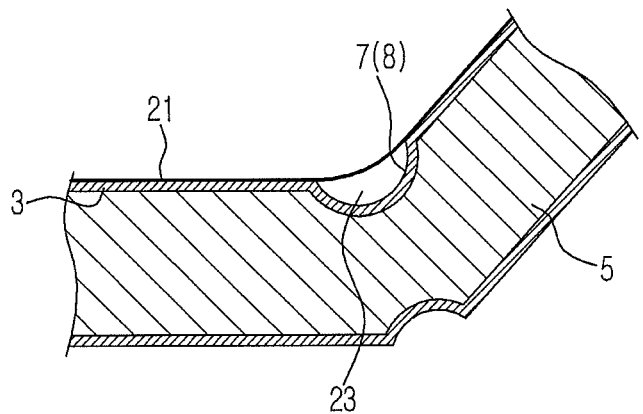
FIG. 2A is an enlarged sectional view showing grooves in a case in which a bendable region of the vacuum insulation material according to the embodiment of the present disclosure covers the outside of a curved region of an inner case of a refrigerator.
Figure 2B:
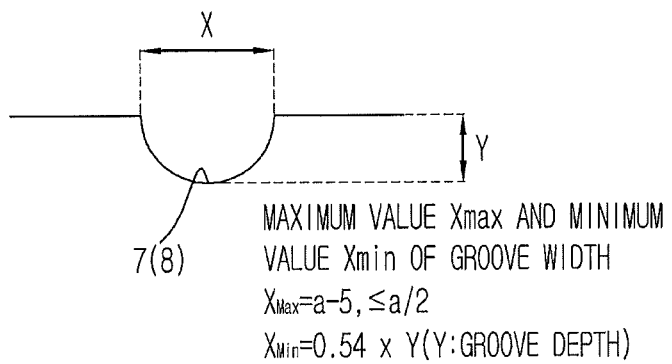
FIG. 2B is an enlarged sectional view taken along line Ia-Ia of FIG. 1B showing the shape of an inner groove and an outer groove.
Figure 2C:
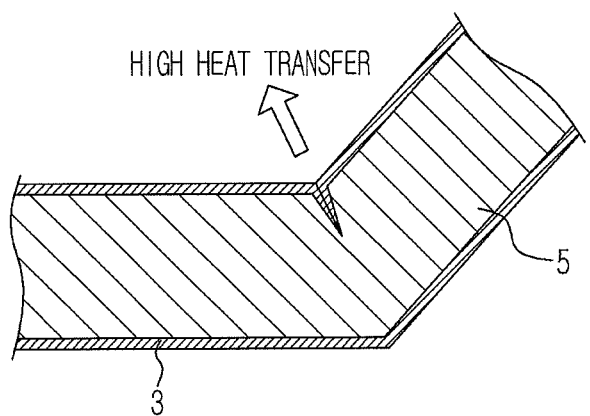
FIG. 2C is an enlarged sectional view showing a groove of a vacuum insulation material according to a reference example.

FIG. 2A is an enlarged sectional view showing grooves in a case in which the bendable region 11 of the vacuum insulation material 1 according to the embodiment of the present disclosure covers the outside of a curved region of an inner case 21 of a refrigerator, FIG. 2B is an enlarged sectional view taken along line Ia-Ia of FIG. 1B showing the shape of an inner groove 8 and an outer groove 7, and FIG. 2C is an enlarged sectional view showing a groove of a vacuum insulation material according to a reference example. In FIG. 2A, there is shown an example in which the bendable region 11 is bent in a state in which the top at which the outer grooves 7 and the inner grooves 8 are formed is directed inside.

As shown in FIG. 2B, on the assumption that the minimum value and the maximum value of a groove width of the grooves (i.e. outer grooves 7 and inner grooves 8) are denoted by Xmin (mm) and Xmax (mm), a groove depth of the grooves is denoted by Y (mm), and an interval between the inner grooves 8 is denoted by a (mm), the following equations may be satisfied.

$$X\text{min}=0.54Y \qquad \text{Equation 1}$$

$$0<(a-5)=X\text{max}\leq a/2 \qquad \text{Equation 2}$$

In addition, the interval a may be 6≤a≤20.

According to this construction, sealed spaces 23 may be defined in the grooves (inner grooves 8 and outer grooves 7) facing the curved region of an object to be covered (inner case) 21 in a state in which the vacuum insulation material is folded and bent. The sealed spaces 23 contain gas, such as air, exhibiting low thermal conductivity. Consequently, insulation performance at the bendable region 11 is further improved. More specifically, R bending having a small bending radius may be achieved at the bendable region 11 through optimization of pitch between the grooves and thermal conduction by convection due to minimization in volume of the sealed spaces 23 may be restrained through optimization of groove width. The "R bending" means bending the bendable region such that the bendable region is curved.

In a case in which any one of the top and bottom of the vacuum insulation material 1 at which the grooves are formed is folded and bent along the grooves as described above, spaces are defined in the grooves such that portions of the sheathing material 3 do not contact each other in a state in which the vacuum insulation material is folded and bent.

On the other hand, if the groove width X deviates from a range defined by Equation 1 and Equation 2, the grooves are distorted in a state in which the vacuum insulation material is folded and bent as shown in the reference example of FIG. 2C. As a result, portions of the sheathing material 3 contact each other. Consequently, heat transfer through the sheathing material is increased, thereby reducing insulation performance of the vacuum insulation material 1.

In addition, FIG. 2A shows an example in which the sealed spaces 23 are formed by the inner grooves 8 and the outer grooves 7 and the outside of the inner case 21. However, embodiments of the present disclosure are not limited thereto. For example, a sheet exhibiting high adhesion may be provided between the vacuum insulation material 1 and the inner case 21 such that the sealed spaces 23 are formed by the inner grooves 8 and the outer grooves 7 and the sheet. In this case, the vacuum insulation material 1 may not be attached to the outside of the inner case 21 but may be attached to the inside of an outer case 33. Alternatively, the vacuum insulation material 1 may not be attached to both the inner case 21 and the outer case 33 but may be disposed between the inner case 21 and the outer case 33. In addition, in a case in which a plurality of grooves is formed at the surface of the vacuum insulation material 1 attached to the outer case 33, sealed spaces may be formed between the grooves and the outer case 33.

In the vacuum insulation material 1, the grooves (inner grooves 8 and 10 and outer grooves 7 and 9) may have a groove width of about 1 mm to 10 mm within a range satisfying Equation 1 and Equation 2. In a case in which the thickness of the vacuum insulation material 1 is 6 mm, the grooves may have a depth of about 0.4 mm to 0.85 mm. In addition, an interval between adjacent outer groove 7 and inner groove 8 and between adjacent outer groove 9 and inner groove 10 may be 6 mm to 50 mm and an interval between the inner grooves 8 and between the inner grooves 10 may be 6 mm to 20 mm.

For example, the grooves (inner grooves 8 and 10 and outer grooves 7 and 9) may have a groove width of about 2 mm. In a case in which the thickness of the vacuum insulation material 1 is 6 mm, the grooves may have a depth of about 0.6 mm±0.2 mm (about 10%±3.3% the thickness of the vacuum insulation material 1) per surface and a depth of about 1.2 mm±0.4 mm (about 20%±6.7% the thickness of the vacuum insulation material 1) as the total of both surfaces. In addition, an interval between adjacent outer groove 7 and inner groove 8 and between adjacent outer groove 9 and inner groove 10 may be about 20 mm and an interval between the inner grooves 8 and between the inner grooves 10 may be about 10 mm.

In addition, a ratio of the groove depth to the thickness of the vacuum insulation material 1 may be 12% to 28% as the total of both surfaces. The grooves may be formed only at one surface of the vacuum insulation material 1. In order to restrain an elongation ratio of the sheathing material 3, however, the grooves may be formed at the top and bottom of the vacuum insulation material 1 such that the grooves are opposite to each other and a ratio of the groove depth to the thickness of the vacuum insulation material 1 may be 6% to 14% per surface.

According to this construction, a ratio of the groove depth to the thickness of the vacuum insulation material 1 is set to have an optimal range, thereby improving bending formability (shape retention) while minimizing deterioration of gas barrier performance of the elongated sheathing material 3 and deterioration of insulation efficiency.

Hereinafter, materials constituting the vacuum insulation material 1 according to this embodiment will be described.

The core 5 may be formed of powder, such as silica powder, alumina powder, or fumed silica, or fiber, such as inorganic fiber or organic fiber, which may be used individually or in combination. In order to improve insulation efficiency and high adaptation, handling, and workability when used for the sheathing material 3, the core 5 may be formed of fiber, such as inorganic fiber or organic fiber, exhibiting flexibility or a stack. The sheathing material 3 is formed of a laminate film based on a polymer compound, such as plastic, exhibiting a gas barrier property to maintain high vacuum therein.

In addition, an adsorbent may be disposed in the sheathing material 3 together with the core 5 to restrain deterioration of insulation efficiency due to penetration of external air or vapor into the vacuum insulation material 1 through the sheathing material 3. Positions at which the adsorbent is disposed are not particularly restricted unless the adsorbent is disposed at positions at which the grooves (inner grooves 8 and 10 and outer grooves 7 and 9) are formed. For example, the adsorbent may be disposed between thick vacuum insulation materials 1 or a plurality of adsorbents may be individually disposed at a plurality of positions. In addition, various kinds of adsorbents may be used. In addition, the core 5 may be provided with an adsorbent receiving part. In this case, the core 5 may be reduced by the thickness of the adsorbent such that the adsorbent is fixedly disposed at the reduced portion of the core 5. Planarity is further improved through formation of such an adsorbent receiving part.

Figure 3:
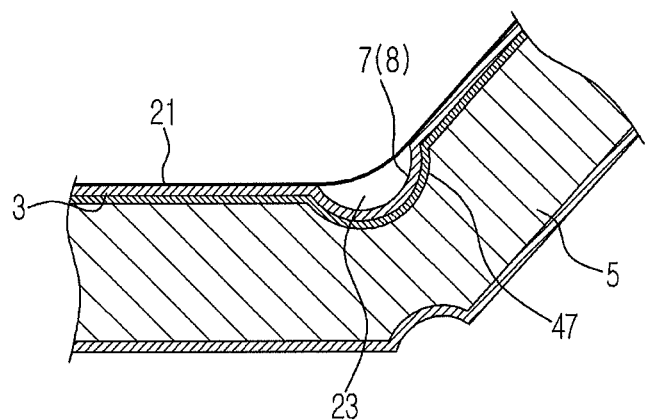
FIG. 3 is an enlarged sectional view showing a vacuum insulation material according to a modification of the embodiment of the present disclosure.

In addition, as in a vacuum insulation material according to a modification shown in FIG. 3, an adsorption sheet 47 containing an adsorbent may be provided between the sheathing material 3 and the core 5 in a state in which the adsorption sheet 47 is in tight contact with the sheathing material 3. In this case, a portion of the core 5 at which grooves are formed may be covered by the adsorption sheet 47.

According to this construction, the grooves may be easily covered using the adsorption sheet 47. Even when pin holes are formed at portions of the sheathing material 3 corresponding to the grooves, external air penetrating through the pin holes is adsorbed by the adsorption sheet 47 disposed between the sheathing material 3 and the core 5, thereby restraining lowering of a vacuum degree in the vacuum insulation material 1 and thus improving long-term reliability of the vacuum insulation material 1.

In addition, the thickness of the core is not greatly reduced to dispose the adsorption sheet 47 at the grooves. Consequently, deterioration of insulation efficiency and bending workability at the adsorbent insertion portion may be restrained as compared with a case in which a particle type adsorbent is used.

The adsorption sheet 47 may be a resin film having an adsorbent dispersed therein. In this case, penetrated external air may be efficiently absorbed in respective positions of the sheathing material 3 where the pin holes are generated.

In addition, the adsorbent is not particularly restricted so long as the adsorbent adsorbs moisture or gas. An example of the adsorbent applicable to the vacuum insulation material 1 according to this embodiment or a modification thereof may include carbon fiber, such as synthetic zeolite (hydrophilic or hydrophobic), carbon nanotube, carbon nanohorn, carbon nanofiber, or graphite nanofiber, or a physical adsorbent, such as active carbon, or silica gel, which adsorbs molecules to be adsorbed using physicochemical affinity. Moreover, a gas adsorbent, such as an alkali earth metal oxide (e.g. calcium oxide, barium oxide, or strontium oxide) including calcium oxide, alkali metal oxide, or metal oxide, may be used. Alternatively, a chemical reaction type adsorbent, such as an alloy including a barium-lithium alloy, which is coupled to molecules to be adsorbed through chemical reaction may be used. Known adsorbents may be applied individually or in combination. In addition, the shape of the adsorbent is not particularly restricted. For example, the adsorbent may be formed in the shape of a pellet, bead, powder, etc.

The core 5 may be formed of inorganic fiber, such as glass wool, silica alumina fiber, silica fiber, alumina fiber, ceramic fiber, or rock wool, synthetic organic fiber, such as polyester fiber represented by polyethylene terephthalate fiber (PET fiber), polystyrene fiber, acryl fiber, polyethylene fiber, polypropylene fiber, nylon fiber, polyvinyl alcohol fiber, polyurethane fiber, or rayon fiber, or natural organic fiber, such as linen, silk, cotton, or wool. The fiber may be short fiber or long fiber. In addition, the inorganic fiber and the organic fiber may be used individually or in combination.

The sheathing material 3 is formed of a laminate film based on a polymer compound, such as plastic. The laminate film is constituted by stacking two to five or more single-layered films. The number of layers of the stacked film or kind (material) and combination of the film are set such that the laminate film has a sufficient gas barrier property to retain high vacuum in the vacuum insulation material 1.

Specifically, the sheathing material 3 includes a surface protection layer to prevent leakage (vacuum destruction), a gas barrier layer to provide a gas barrier property, and a thermally welded layer for sealing from the outer layer. In addition, two or more gas barrier layers may be provided to prevent generation or magnification of pin holes caused by elongation of the sheathing material 3 due to the grooves formed at the vacuum insulation material 1. Even when pin holes are formed at the first gas barrier layer, therefore, the second gas barrier layer may restrain penetration of external air, thereby improving reliability of the vacuum insulation material 1.

In addition, a deposit film may be provided at at least one of the gas barrier layers to reduce thermal conductivity. Specifically, a deposit film may be provided at at least one of the gas barrier layers and a foil film may be provided at at least one of the gas barrier layers.

As an example, the sheathing material 3 may be formed of a four-layered laminate film including a surface protection layer formed of polyamide (PA), a gas barrier layer formed of aluminum-deposited polyethylene terephthalate (PET), another gas barrier layer formed of aluminum (Al) foil, and a thermally welded layer formed of high-density polyethylene (HDPE).

The surface protection layer may be formed of bi-axially oriented polypropylene (OPP) exhibiting low hygroscopicity or polyethylene terephthalate instead of polyamide to improve insulation efficiency. The gas barrier layer may be formed of aluminum-deposited ethylene-vinyl alcohol copolymer (EVOH) or aluminum-deposited polyvinyl alcohol (PVOH) instead of aluminum foil to reduce a heat bridge, thereby improving insulation efficiency. The thermally welded layer may be formed of middle-density polyethylene (MDPE), low-density polyethylene (LDPE), linear low-density polyethylene (LLDPE), cast polypropylene (CPP), or polybutylene terephthalate (PBT) instead of high-density polyethylene. In addition, deposition may be metal deposition, such as stainless steel deposition (SUS), or inorganic oxide deposition, such as silica deposition.

The thickness of the film may be set in consideration of insulation performance, cost, elongation, gas barrier property, and reliability. Specifically, the plastic film (polymer film) may have a thickness of about 10 to 50 µm the aluminum foil may have a thickness of about 6 to 12 µm the deposit film may have a thickness of about 0.04 to 0.12 µm and the sheathing material 3 may have a thickness of 60 to 120 µm The layers may be laminated using dry lamination to couple films using two-component curable urethane adhesive or extruding lamination to couple films using dissolved polyethylene. In addition, the outer surface of the surface protection layer may be surface treated using a corona discharge process, a frame process, or a plasma process. This surface treatment may improve adhesion between the vacuum insulation material 1 and the adhesive or the urethane foam.

In addition, breaking elongation of the sheathing material 3 in a first direction may be identical to or different from that in a second direction which is perpendicular to the first direction. In the laminate film constituting the sheathing material 3, the first direction may be a film flow direction (MD direction) and the second direction may be a direction (TD direction) perpendicular to the film flow direction (MD direction) during manufacture of the film.

In a case in which the breaking elongation of the sheathing material 3 in the first direction (MD direction) is different from that in the second direction (TD direction), the grooves (inner grooves 8 and 10 and outer grooves 7 and 9) may extend perpendicularly to the direction in which the breaking elongation is relatively small. The term "perpendicularly" to the extending direction of the grooves means "substantially perpendicularly" to allow a dimensional error during manufacture or deformation after manufacture.

In a case in which the breaking elongation of the sheathing material 3 is relatively small, the materials constituting the sheathing material 3 are not easily elongated and the gas barrier property is not easily lowered when the sheathing material 3 is bent. This is because, when the sheathing material 3 is not easily elongated, generation or magnification of pin holes at the gas barrier layer is restrained. With the above construction, therefore, damage to the sheathing material 3 elongated by formation of the grooves and bending may be reduced and lowering of the gas barrier performance at the grooves and the bendable region 11 may be restrained.

The laminate film constituting the sheathing material 3 may include two or more polymer films having different orientations. For example, the laminate film may include a combination of one or more selected from among a mono-axially oriented film, a bi-axially oriented film, and a cast film. A combination of orientation degrees of the films may be set to adjust a breaking elongation ratio in the MD direction and the TD direction. At this time, the films may be coupled in a state in which the directions (e.g. vertical and horizontal directions) of the films having the same orientations are changed.

As an optimum range of the breaking elongation ratio of the laminate film, the breaking elongation ratio in the direction in which the breaking elongation of the sheathing material 3 is small may be set to 40% to 150% in terms of restraining crack at the sheathing material 3 and reduction of the gas barrier performance. In addition, the bi-axial orientation may include sequential orientation in which orientation is sequentially performed and simultaneous orientation in which orientation is simultaneously performed. However, orientation methods, including orientation sequences, are not particularly restricted.

The sheathing material 3 may be coupled, for example, by thermally welding two laminate films in a state in which layers of the films to be thermally welded face each other. A thermal welding width of the sheathing material 3 is not particularly restricted. Some or the entirety of the edge of the sheathing material 3 into which the core 5 is not inserted may be welded. However, the thermal welding width may be 10 to 20 mm to restrain penetration of gas through the end of the laminate film and to minimize the edge having no insulation.

The combination of the two laminate films constituting the sheathing material 3 may include any one selected from among a combination of two films including metal foils (opposite side foil type), a combination of two films including deposit films instead of metal foils (opposite side deposit type), and a combination of a film including a metal foil and a film including only a deposit film instead of a metal foil (foil/deposit type).

In addition, the edge of the sheathing material 3 at which the core 5 is not present may be folded and the folded portion may overlap the core 5 such that the folded portion is fixed, which is referred to as ear-folding. The folded portion may be fixed using adhesive, such as cellophane tape, double-sided tape, or a hot melt. In addition, the folding direction is not particularly restricted. For example, the edge of the sheathing material 3 may be folded toward the foil film, the deposit film, a step part (the surface at which the grooves are formed), or a flat part (the surface at which the grooves are not formed). When the vacuum insulation material 1 is attached to the inner case of the refrigerator, the edge of the sheathing material 3 may be folded in the direction opposite to the direction in which the vacuum insulation material 1 is attached.

As described above, therefore, the vacuum insulation material 1 according to this embodiment or the modification exhibits good shape adaptation to a curved object to be covered and excellent bending formability. In addition, reduction in a gas barrier property of the sheathing material 3 is restrained when the vacuum insulation material is bent as compared with the conventional vacuum insulation material. Therefore, the vacuum insulation material 1 according to this embodiment or the modification may cover a curved member of an apparatus for keeping warm and cool with high insulation, thereby reducing energy consumption without increasing the shape of the apparatus for keeping warm and cool. In addition, a capacity ratio of the apparatus for keeping warm and cool may be increased.

Method of Manufacturing Vacuum Insulation Material

The vacuum insulation material 1 according to this embodiment is manufactured as follows.

First, a core 5 is dried using a drying furnace to remove moisture or gas from the core 5 and an adsorbent is inserted into the core 5. Subsequently, the stacked core 5 is inserted into a sheathing material 3, which has been dried in the drying furnace, such as a vacuum furnace, in advance and three sides of which have been thermally welded such that the sheathing material 3 is formed in the shape of a bag, and the sheathing material 3 is set in a vacuum chamber to evacuate the sheathing material 3. Upon reaching a predetermined vacuum degree, the remaining side of the sheathing material 3, which is not thermally welded, is sealed by thermal welding while evacuating the sheathing material 3 and then the sheathing material 3 is removed from the vacuum chamber. As a result, a plate-shaped vacuum insulation material 1 is obtained.

Subsequently, a plurality of grooves is formed at at least one of the top and bottom of the vacuum insulation material 1 by pressing using a jig. The planar shape of the vacuum insulation material 1 before bending may be a rectangle as shown in FIG. 1B. However, embodiments of the present disclosure are not limited thereto.

Concrete Examples of Vacuum Insulation Material

Concrete examples of the vacuum insulation material 1 according to this embodiment and members constituting the vacuum insulation material will hereinafter be described. The respective members are denoted by the same reference numerals as in FIGS. 1A and 1B. In addition, in this specification, breaking elongation is elongation from the original distance between support points in percent when a sample is pulled while increasing tensile load such that the sample is broken and an elongation ratio is a tension distance to the original distance between the support points in percent when the sample is pulled while increasing tensile load such that the sample is elongated.

First Concrete Example

As a first concrete example, only the sheathing material 3 is prepared to perform evaluation. The sheathing material 3 is a laminate film obtained by coupling a polyamide film having a thickness of 25 μm an aluminum (about 50 nm)-deposited polyethylene terephthalate film having a thickness of 25 μm an aluminum foil having a thickness of 6 μm and a high-density polyethylene film having a thickness of 50 μm using dry lamination.

Figure 4:
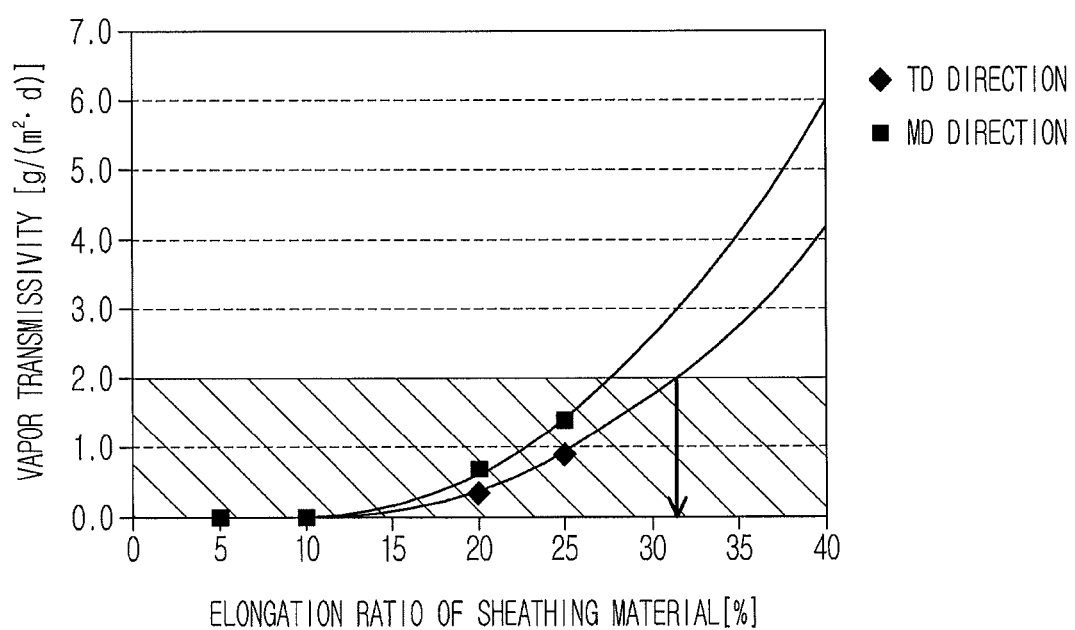
FIG. 4 is a view showing a relationship between an elongation ratio and vapor transmissivity of a sheathing material in MD and TD directions.

In addition, breaking elongation of the sheathing material 3 is set to 114% in the MD direction and 98% in the TD direction (based on JIS K7127: 1999). A relationship between an elongation ratio and vapor transmissivity of a sheathing material in the MD and TD directions is shown in FIG. 4. The vapor transmissivity is measured using a MOCON Aquatran based on ISO15106-3. In the vapor transmissivity measurement, a tensile test is performed under a condition in which each test sample of the sheathing material 3 has a width of 100 mm and a length of about 240 mm. The test condition is based on JIS K7127: 1999. In addition, the original distance between support points is 100 mm, test temperature is 23° C., and tensile speed is 2 mm/min.

As shown in FIG. 4, the vapor transmissivity in both the TD and MD directions is increased as the elongation ratio is increased. Vapor transmissivity necessary to maintain a vacuum degree in the vacuum insulation material is about 2 g/m²·d or less. When the elongation ratio of the laminate film according to the above construction exceeds 33%, therefore, the vapor transmissivity is greater than an allowable range, i.e. the gas barrier property is less than an allowable range.

In addition, even in the elongation ratio having the same TD direction in which the breaking elongation is relatively small, the vapor transmissivity is less than in the MD direction and the gas barrier property is greater than in the MD direction. As a result, the direction in which the sheathing material 3 is elongated by bending coincides with the direction in which the breaking elongation of the sheathing material is relatively small, thereby restraining reduction in a gas barrier property of the sheathing material 3. In a case in which the breaking elongation in the TD direction is smaller than that in the MD direction as in this concrete example, the circumferential direction of the bent portion of the sheathing material 3 is set to the TD direction, thereby obtaining the vacuum insulation material 1, the gas barrier property of which has been retrained from being lowered.

Second Concrete Example

A plate-shaped sheathing material having no grooves is manufactured using the above manufacturing method. The sheathing material 3 is a laminate film obtained by coupling a polyamide film having a thickness of 25 µm an aluminum (about 50 nm)-deposited polyethylene terephthalate film having a thickness of 25 µm an aluminum foil having a thickness of 6 µm and a high-density polyethylene film having a thickness of 50 µm using dry lamination. A short fiber glass wool stack having an average fiber diameter of about 4 µm is used as the core 5. An adsorbent is omitted in consideration of measurement.

Figure 10:
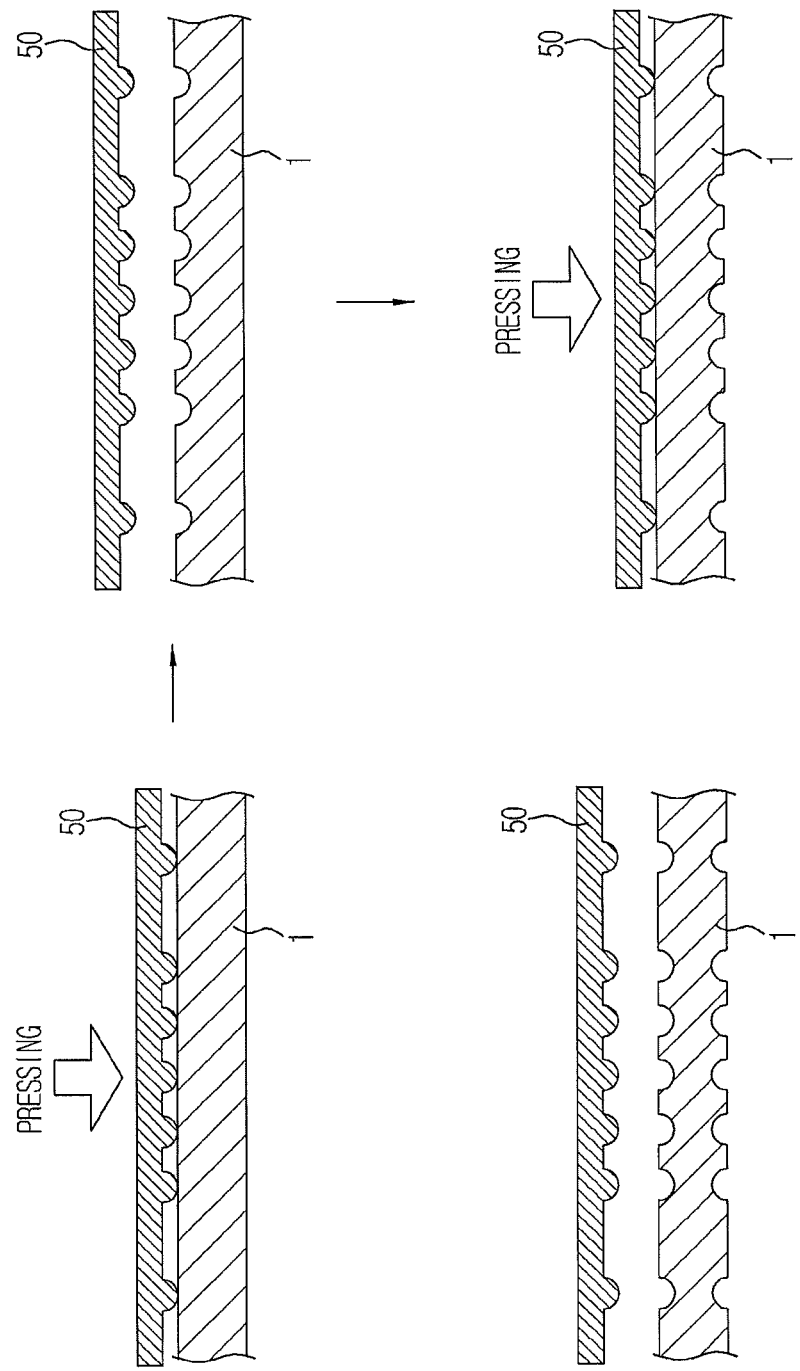
FIG. 10 is a sectional view showing a process of forming a plurality of grooves in a method of manufacturing the vacuum insulation material according to the embodiment of the present disclosure.

The vacuum insulation material 1 according to this concrete example may be manufactured by forming a plurality of grooves at the vacuum insulation material after the vacuum insulation material is formed. That is, an example of a manufacturing process of the vacuum insulation material 1 using the manufacturing method described in this embodiment is as follows. FIG. 10 is a sectional view showing a process of forming a plurality of grooves at the vacuum insulation material 1 according to this embodiment (this concrete example).

First, as shown in FIG. 10, grooves are formed at the top (first surface) and the bottom (second surface) of a plate-shaped vacuum insulation material 1 by pressing using a jig 50 having a plurality of semi-cylindrical members having a width of 2.5 mm arranged at predetermined intervals. The grooves formed at the bottom are opposite to those formed at the top. In other words, the grooves formed at the top and the grooves formed at the bottom completely overlap when viewed from above the vacuum insulation material 1. The grooves are formed at almost the same positions of the top and bottom in the thickness direction.

In addition, at a position (bendable region 11) at which R bending is performed, a plurality of grooves is formed while being arranged at intervals. The grooves include a pair of outer grooves 7 and 9 and a plurality of inner grooves 8 and 10 formed inside the outer grooves 7 and 9.

The interval between each outer groove 7 and a corresponding one of the inner grooves 8 adjacent to each outer groove 7 is greater than that between the inner grooves 8. In addition, the interval between each outer groove 9 and a corresponding one of the inner grooves 10 adjacent to each outer groove 9 is greater than that between the inner grooves 10.

In this concrete example, the interval between the inner grooves 8 and 10 is 10 mm and the interval between the outer grooves 7 and 9 and the inner grooves 8 and 10 adjacent to the outer grooves 7 and 9 is 20 mm. In addition, a three point bending test is performed under a condition in which the vacuum insulation material 1 used to measure bending modulus has a width of 50 mm and a length of 120 mm. The test condition is based on JIS K7221. That is, a pusher and a support have a diameter of 5%, the distance between support points is 100 mm, a test sample is provided for testing after the test sample is maintained at a temperature of 23° C. and a humidity of 50% for 88 hours or more (based on JIS7100), test temperature and humidity are set to 23° C. and 50%, and bending speed is 10 mm/min.

Figure 5:
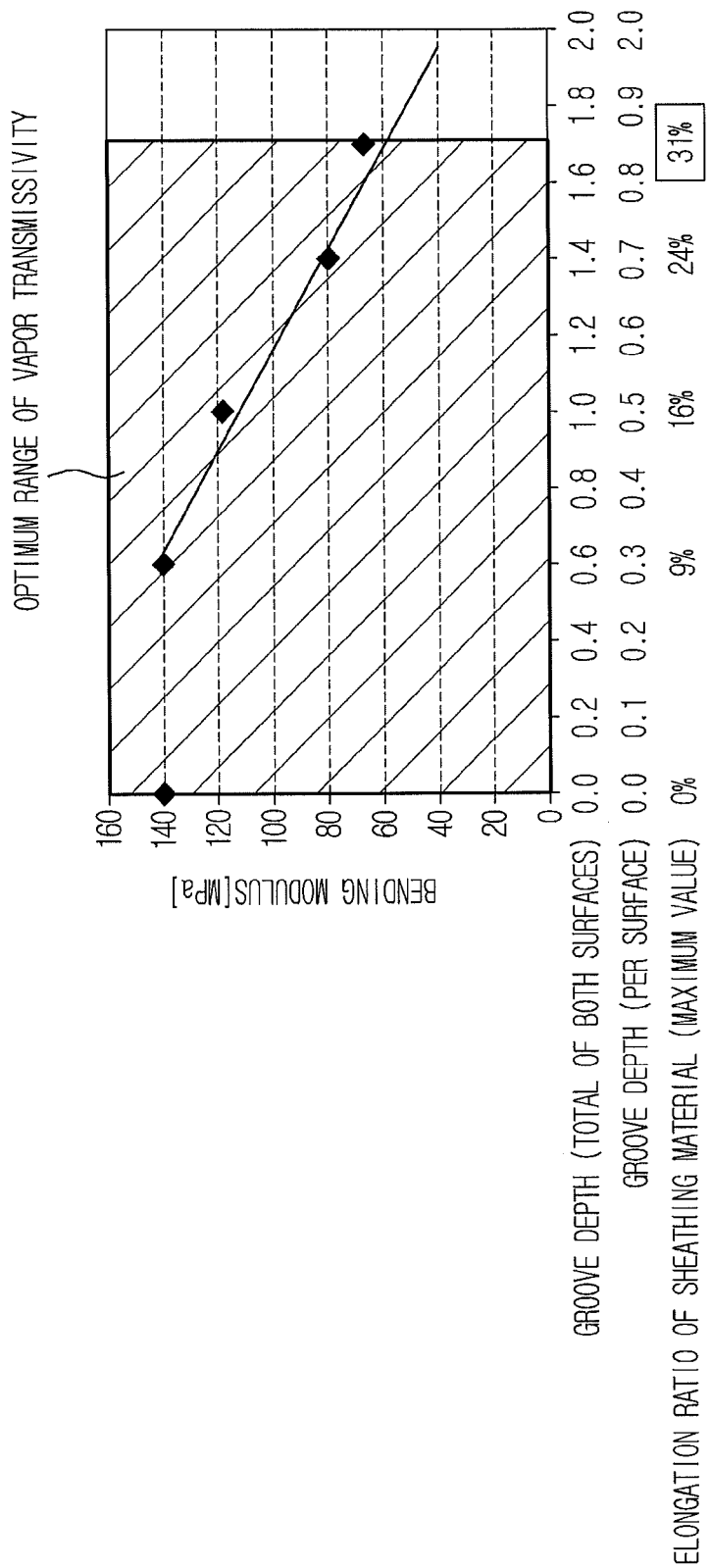
FIG. 5 is a view showing a relationship between a groove depth and bending modulus of the vacuum insulation material.
Figure 9:
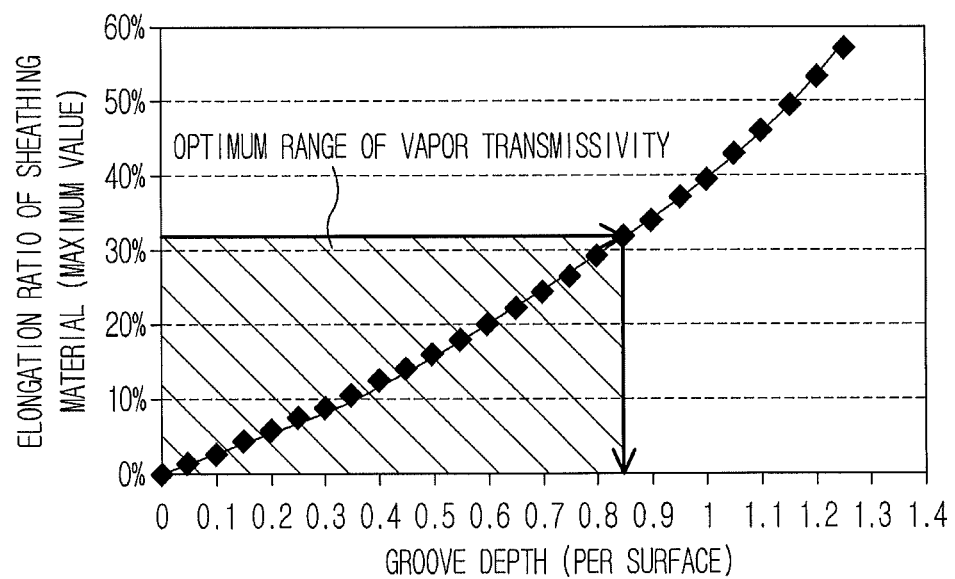
FIG. 9 is a view showing a relationship between a groove depth of a vacuum insulation material and an elongation ratio of a sheathing material.

A relationship between a groove depth and bending modulus of the vacuum insulation material is shown in FIG. 5. In addition, FIG. 5 also shows the maximum elongation ratio which may occur at the sheathing material 3 while the grooves are formed. A proper range of the vapor transmissivity shown in FIG. 5 is obtained from the result of FIG. 4. In addition, FIG. 9 is a view showing a relationship between the groove depth of the vacuum insulation material and the elongation ratio of the sheathing material.

As groove depth increases, bending modulus decreases. In this concrete example, as shown in FIGS. 5 and 9, the groove depth of the vacuum insulation material suitable for bending formation of the vacuum insulation material 1 is 0.4 mm or more per surface. In addition, bending strength exhibits a tendency similar to bending modulus. Since the maximum elongation ratio is increased as the groove depth is increased, however, the gas barrier property is lowered if the groove depth is increased as may be seen from the result of the first concrete example. Optimal ranges of the sheathing material direction and groove dimensions (width and depth) may be obtained through comparison among the elongation ratio of the sheathing material, the vapor transmissivity, and the bending modulus considering the above.

1) Sheathing material direction: direction in which breaking elongation is relatively small (in this case, the TD direction), an elongation ratio of 0 to 32%

2) Groove depth of vacuum insulation material 1: 0.4 mm to 0.85 mm per surface (6 to 14% the thickness per surface and 12 to 28% the sum of the thicknesses at both surfaces)

Third Concrete Example

Figure 6:
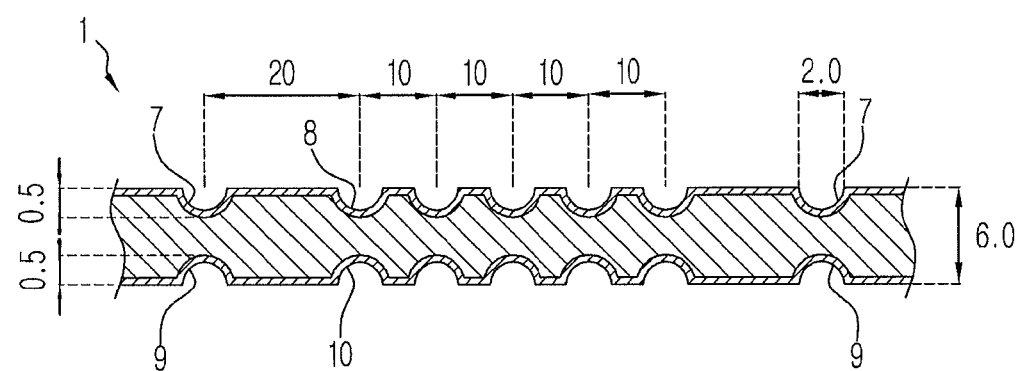
FIG. 6 is a view showing a vacuum insulation material according to a third concrete example of the embodiment of the present disclosure.

A vacuum insulation material 1 having a width of 400 mm and a length of 700 mm is manufactured based on construction of the material described in the first concrete example and the manufacturing method described in the second concrete example. The vacuum insulation material 1 has a thickness of about 6 mm and an interval between grooves is as shown in FIG. 6. That is, a plurality of grooves has a groove width of 2 mm and a groove depth of 0.5 mm (±0.2 mm). A bendable region 11 of the vacuum insulation material 1 obtained as described above is folded and bent along the grooves such that the bendable region 11 has an R shape (see FIG. 7A). As a result, the bendable region 11 may be processed to have an R50 shape (i.e. a bending radius of 50 mm). The vacuum insulation material 1 is maintained in this state for three days or more. However, leakage does not occur at the vacuum insulation material 1. In addition, thermal conductivity is measured using a heat flow meter (JIS A 1412-2). The results reveal that thermal conductivity after bending is not different from that before bending. In addition, even in a case in which the size of the vacuum insulation material 1 is decreased or increased, the vacuum insulation material is processed in the same manner.

Fourth Concrete Example

A vacuum insulation material 1 according to this concrete example is obtained by changing the interval between the grooves of the vacuum insulation material 1 according to the third concrete example. Specifically, the interval between the inner grooves 8 and 10 is set to 7.5 mm and the interval between the outer grooves 7 and 9 and the inner grooves 8 and 10 adjacent to the outer grooves 7 and 9 (i.e. the interval between the grooves at the bending start point and the bending end point) is set to 15 mm. As a result, the vacuum insulation material is processed to have an R40 shape (i.e., a bending radius of 40 mm). The vacuum insulation material 1 is maintained in this state for three days or more. However, leakage does not occur at the vacuum insulation material 1.

When the vacuum insulation material 1 is bent, therefore, shape adaptation of the bendable region 11 may be improved. Consequently, the vacuum insulation material 1 may be formed in a desired shape without leakage. Furthermore, when the vacuum insulation material 1 is applied to a refrigerator, the vacuum insulation material 1 may be mounted at a position of the refrigerator where the conventional insulation material may not be mounted and covering area provided by the vacuum insulation material 1 may be increased, thereby lowering energy consumption.

In addition, in this concrete example, as shown in FIG. 2A, sealed spaces 23, in which air is present, may be defined between the grooves and the object to be covered or the film after the vacuum insulation material 1 is bent. Since the sheathing material 3, including the gas barrier layer formed of the metal foil or the metal deposit film, has low thermal conductivity than air. Consequently, insulation performance at the grooves of the vacuum insulation material 1 may be improved.

In addition, as shown in FIG. 3, an adsorption sheet formed by dispersing an adsorbent in a resin film may be interposed between the sheathing material 3 and the core 5 to cover the grooves of the core 5 as needed. Even when pin holes are formed at portions of the sheathing material 3 corresponding to the grooves of the core 5, external air penetrating the pin holes are adsorbed by the adsorption sheet 47, thereby restraining lowering of a vacuum degree in the vacuum insulation material 1 and thus improving long-term reliability of the vacuum insulation material 1.

Another Embodiment

Figure 7A:
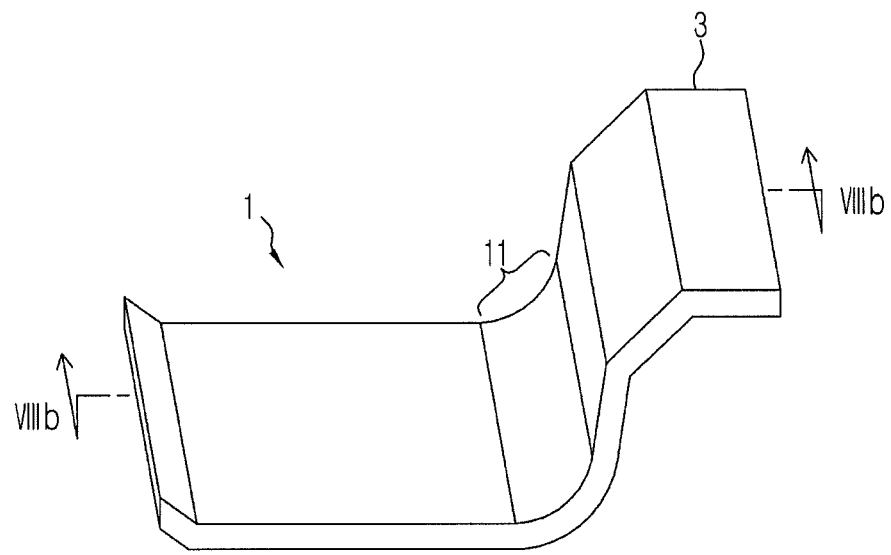
FIG. 7A is a perspective view showing a bent vacuum insulation material.
Figure 7B:
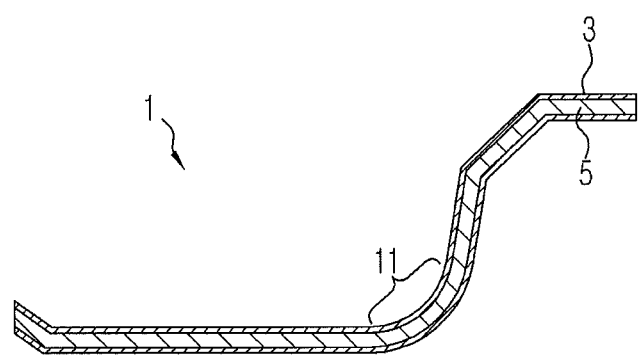
FIG. 7B is a sectional view of the vacuum insulation material.
Figure 8:
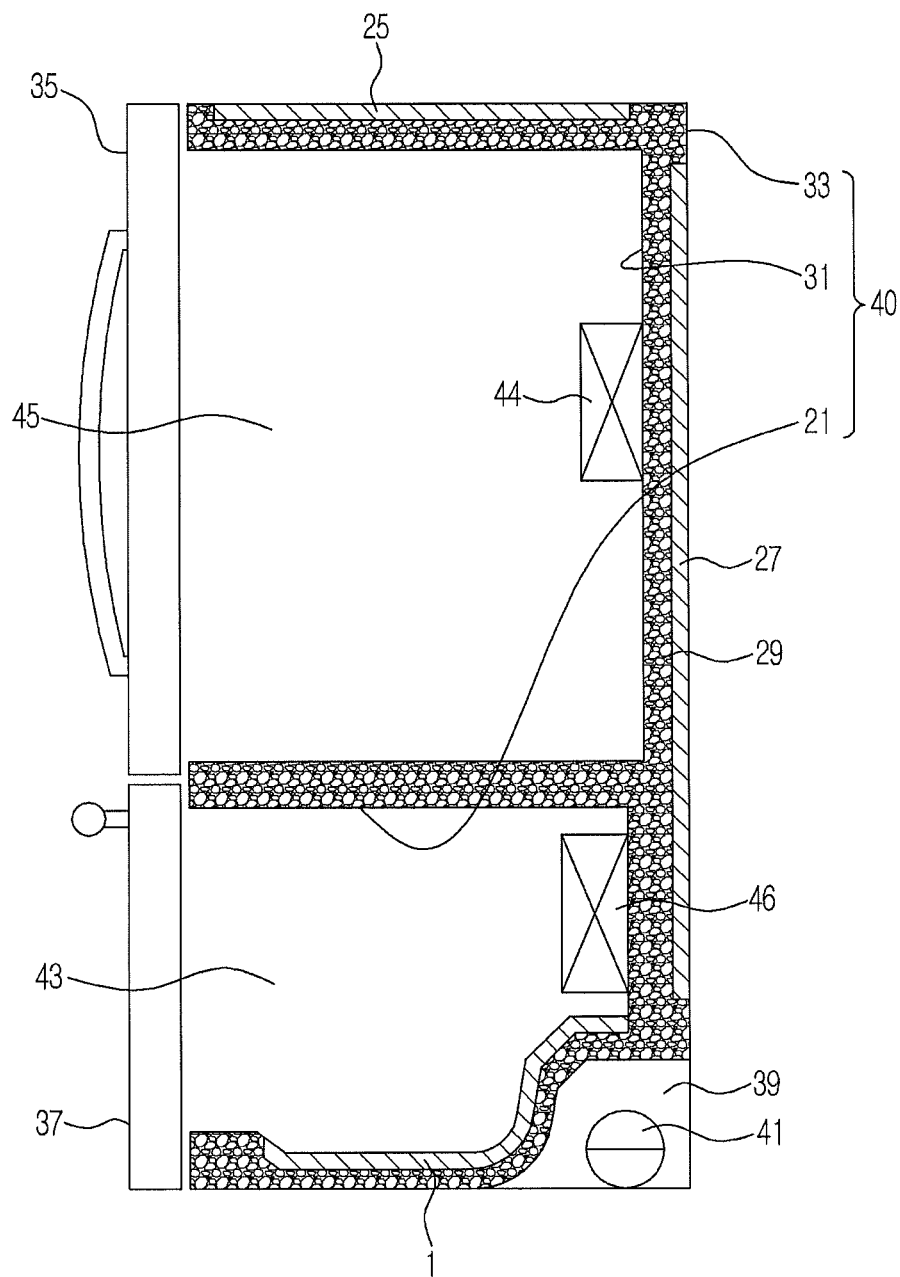
FIG. 8 is a sectional view showing a refrigerator according to another embodiment of the present disclosure using a bent vacuum insulation material.

FIG. 7A is a perspective view showing a bent vacuum insulation material 1 and FIG. 7B is a sectional view of the vacuum insulation material 1. In addition, FIG. 8 is a sectional view showing a refrigerator according to another embodiment of the present disclosure using a bent vacuum insulation material 1. The vacuum insulation material 1 shown in FIGS. 7A and 7B is obtained by bending the bendable area 11 of the vacuum insulation material 1 according to the third concrete example of the previous embodiment along the grooves into a curved state and bending the other portion of the vacuum insulation material 1 according to the shape of an object to be covered.

As shown in FIG. 8, the refrigerator according to this embodiment includes an outer case 33, inner cases 21 and 31 received in the outer case 33 to define storage compartments, the vacuum insulation material 1 shown in FIGS. 7A and 7B, which is disposed between the outer case 33 and the inner cases 21 and 31. The inner cases 21 and 31 and the outer case 33 have openings formed at fronts thereof. In the example of FIG. 8, the storage compartment in the inner case 21 is a freezing compartment 43 having a freezing temperature band and the storage compartment in the inner case 31 is a refrigerating compartment 45 having a refrigerating temperature band.

The inner cases 21 and 31, the outer case 33, the vacuum insulation material 1, a drawer type door 37 to close the opening of the inner case 21, and a hinge type door 35 to close the opening of the inner case 31 constitute an insulation case unit 40. The outer case 33 is exposed excluding a portion thereof. The outer case 33 is connected to the inner cases 21 and 31 at the front end thereof. In addition, a vacuum insulation material 27 is disposed between the inner case 31 and the outer case 33 at the rear of the refrigerator. A vacuum insulation material 25 is disposed between the inner case 31 and the outer case 33 at the ceiling of the refrigerator. A vacuum insulation material (not shown) is disposed between the inner case 31 and the outer case 33 at each side of the refrigerator. The vacuum insulation materials 25 and 27 may be vacuum insulation materials according to the previous embodiment or flat-shaped vacuum insulation materials having no grooves.

In addition, the refrigerator according to this embodiment includes (hard) urethane foam 29, a refrigeration cycle including a compressor 41, an electric board, and electric wiring in addition to the insulation case unit 40 (further including components which are not shown). Some refrigerator wiring of the refrigeration cycle, some of the electric wiring, and the vacuum insulation material 1 are disposed in some of a space forming a wall between the outer case 33 and the inner cases 21 and 31 and the other space is filled with an insulation material, such as the urethane foam 29 or foamed polystyrene. The material and thickness of the members are not particularly restricted. For example, the outer case 33 may be formed of iron or stainless steel, the inner cases 21 and 31 may be formed of acrylonitrile butadiene styrene (ABS), and the refrigerant piping may be formed of copper or aluminum. R134a or R600a may be used as the refrigerant.

The refrigerator according to this embodiment may include a compartment having arbitrary temperature in addition to the refrigerating compartment 45 and the freezing compartment 43. The respective compartments are partitioned by a partition exhibiting an appropriate insulation property. In addition, the hinge type door 35 or the drawer type door 37 is mounted at the front of each compartment. A packing to hermetically seal the refrigerator is mounted at the door. In addition, the door exhibits an appropriate insulation property to restrain heat leakage and to prevent condensation. A container to receive food is mounted at the drawer type door 37 such that the container is withdrawn when the door is pulled. Each compartment has a door pocket to receive food at the door. Alternatively, a shelf or a tray, which partitions each compartment, is mounted in each compartment. In addition, an icemaker may be mounted in the refrigerator or an ice dispenser may be provided at the front of the refrigerator.

The refrigeration cycle includes a compressor 41, a condenser, evaporators 44 and 46, a capillary tube, a dryer, and an accumulator, which are coupled to one another via piping to constitute the refrigeration cycle. Basically, the refrigerant circulates in order of the compressor 41, the condenser, the capillary tube, and the evaporators 44 and 46 such that the refrigerant flows back to the compressor 41 from the evaporators 44 and 46. In addition, the dryer is mounted immediately before the capillary tube to remove moisture or prevent blocking. The accumulator is mounted between the evaporators 44 and 46 and the compressor 41 to prevent liquid refrigerant from being suctioned into the compressor 41.

The compressor 41 and the condenser are mounted in a machinery compartment 39 together with a fan for heat dissipation. The evaporators 44 and 46 are mounted at appropriate positions of the rear of the refrigerator. The capillary tube may be mounted in the machinery compartment 39 or embedded in the urethane foam 29. In addition, a heat dissipation pipe to further dissipate heat from the refrigerant is connected between the condenser and the capillary tube. The heat dissipation pipe is disposed at the inside of the outer case 33 or the inside of the front of the partition of the refrigerator in contact to dissipate heat out of the refrigerator. The disposition method is not particularly restricted. For heat dissipation, however, aluminum tape is used for fixing. The length and shape of the heat dissipation pipe are not particularly restricted so long as the heat dissipation pipe sufficiently dissipates heat from the refrigerant.

A fan is mounted above each of the evaporators 44 and 46 to circulate air cooled by each of the evaporators 44 and 46 to cool the refrigerator. The compartments having the evaporators 44 and 46 mounted therein may be connected to the other compartment via a duct. In addition, the duct may be opened and closed by a damper to adjust room temperature.

The number of the evaporators 44 and 46 is not particularly restricted. In consideration of energy saving or cost and internal volume efficiency, one evaporator may be provided at the freezing compartment 43 and another evaporator may be provided at the refrigerating compartment 45 as shown in FIG. 8. A valve may be mounted in the refrigeration cycle to divide the refrigerant. In addition, the size of the evaporators, the number or shape of fins, and piping length, are not particularly restricted so long as the room is set to a desired temperature band.

In addition, the refrigerator is provided at the bottom or the rear thereof with hole-in injection ports to inject urethane. Holes to exhaust gas generated during foaming of the urethane are provided at appropriate regions of the inner cases 21 and 31. The number and size of the injection ports or the gas exhaust holes are not particularly restricted. For example, however, in a case in which urethane foaming is performed in a state in which the injection ports are provided at four positions of the rear of the refrigerator, filling is satisfactorily performed and urethane density is easily uniformalized, thereby improving quality of the refrigerator.

In addition, lighting is mounted at the upper part of the interior of the refrigerator. Kind of the lighting is not particularly restricted. A fluorescent lamp or light emitting diode (LED) may be used as the lighting. In addition, the lighting may have any color so long as the interior of the refrigerator may be easily seen. For example, the lighting may have a color, such as white, blue, and yellow.

The vacuum insulation material 1 may be disposed according to any one or a combination of the following. That is, the vacuum insulation material 1 may be attached to the inside of the outer case 33, the outside of the inner cases 21 and 31, or between the outer case 33 and the inner case 21, or mounted at the outer case 33 and the inner cases 21 and 31 without contact therebetween. Attachment may be achieved using bonding or adhesive, such as double-sided tape or a hot melt. In addition, the hot melt application method includes bead type, roll coat type, bar coat type, and spiral type methods. Means having sufficient bonding force and suitable for work and process are appropriately selected.

Concrete Example of Refrigerator

A concrete example of the refrigerator according to this embodiment will hereinafter be described.

First Concrete Example

As a first concrete example of the refrigerator according to this embodiment, a refrigerator using the vacuum insulation material 1 according to the third concrete example of the previous embodiment will be described with reference to FIG. 8.

The refrigerator according to this concrete example includes a refrigerating compartment 45 having a refrigerating temperature band and a freezing compartment 43 having a freezing temperature band. The refrigerating compartment 45 is provided above the freezing compartment 43. The temperature difference between the freezing compartment 43 and external air is greater than that between the refrigerating compartment 45 and the external air. For this reason, the thickness (wall thickness) between an outer case 33 and an inner case at the freezing compartment 43 is greater than at the refrigerating compartment 45 to secure insulation performance.

For the convenience of use, two hinge type doors 35 having an insulation property are mounted at the front of the refrigerating compartment 45 such that the doors 35 may be opened to the left and right (French doors). In addition, a drawer type door 37 having an insulation property is mounted at the front of the freezing compartment 43. A packing is mounted at each door to hermetically seal the refrigerator. One evaporator is provided at the rear of the freezing compartment 43 and another evaporator is provided at the rear of the refrigerating compartment 45. In addition, the inner case 31 is depressed at the upper part of the interior of the refrigerating compartment 45 such that a lighting unit, such as an LED, is mounted at the depressed portion.

In the refrigerator, the vacuum insulation material 1 is disposed as follows. Since a machinery compartment 39 is disposed at the rear of the bottom of a main body of the refrigerator, the rear side of the inner case 21 is depressed inward to form a curved region having a predetermined bending radius. In addition, a portion of the outside of the outer case 33 is exposed in the machinery compartment 39.

In the refrigerator according to this concrete example, the vacuum insulation material 1 having a shape shown in FIG. 7A is disposed between the machinery compartment 39 and the freezing compartment 43 to block thermal conduction as shown in FIG. 8. At this time, the vacuum insulation material 1 is attached to the outside of the inner case 21 of the refrigerator along the shape of the inner case 21 using double-sided tape.

In particular, when viewed from above, the entirety of the portion of the inner case overlapping the machinery compartment 39 is covered with the vacuum insulation material 1 to improve insulation between the machinery compartment 39, which has the highest temperature, and the freezing compartment 43, which has the lowest temperature, thereby greatly improving insulation performance of the refrigerator. In addition, according to this insulation structure, the thickness of the insulation material between the machinery compartment 39 and the freezing compartment 43 may be reduced, thereby increasing internal volume of the refrigerator.

In order to maximize the internal volume of the refrigerator while holding the minimum insulation performance, an insulation structure suitable to minimize the thickness of the insulation material may be provided. Specifically, the vacuum insulation material 1 may be thinned and the thickness of a space in which urethane foam flows may be minimized. In this concrete example, the vacuum insulation material 1 has a thickness of 6 mm and the vacuum insulation material 1 having the shape shown in FIGS. 7A and 7B is manufactured by bending and attached to the inner case of the inside of the refrigerator. In addition, urethane foaming is performed in a state in which the minimum portion of the thickness of the space between the outer case 33 and the inner cases 21 and 31 excluding the vacuum insulation material 1 is 15 mm to secure the minimum channel necessary for urethane flow. In this structure, occurrence of a void (portion unfilled with urethane) may be restrained and urethane density may be uniformalized. In addition, insulation performance may be secured even when the insulation thickness is reduced since the vacuum insulation material 1 is provided.

Actually, in the prototype refrigerator, the vacuum insulation material 1 is in tight contact with the inner case without separation therebetween and the urethane is fully filled. Consequently, the insulation structure of the refrigerator having the maximum internal volume while holding the minimum insulation performance may be obtained. In addition, the vacuum insulation material has a thickness of 5 mm to 10 mm and the minimum portion of the urethane foam has a thickness of 15 mm to 20 mm as an optimum range to acquire the insulation structure.

In addition, the vacuum insulation material 1 may be applied to the side, the rear, the ceiling, the bottom, the doors, and the partition of the refrigerator to further improve insulation performance. The refrigerator according to this concrete example may use only the vacuum insulation material 1 according to the previous embodiment and the modification thereof. In addition, plate-shaped vacuum insulation materials or other well-known insulation materials may be used in combination. As a result, the refrigerator having excellent insulation performance, energy saving performance, and internal volume efficiency may be obtained.

The vacuum insulation material and an example of the refrigerator using the same have been described in the above embodiments and the concrete examples thereof. The shape and number of the grooves, the materials constituting the members, and the planar shape of the vacuum insulation material may be properly changed without departing from the principles and spirit of the invention.

In addition, the vacuum insulation material and the insulation case unit having the same may be applied to various apparatuses for keeping warm and cool, such as a hot water supply tank and a beverage vending machine. Even when the members have complex shapes, such as a curved shape, therefore, desired portions may be effectively insulated, thereby efficiently using energy and reducing energy consumption.

As is apparent from the above description, the vacuum insulation material according to the embodiments of the present invention has excellent bending formability while restraining reduction in a gas barrier property of a sheathing material.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vacuum insulation material comprising a pouch-shaped sheathing material having a gas barrier property and a core received in the sheathing material as a spacer, the vacuum insulation material having a bendable region, a first surface, and a second surface opposite to the first surface,
    wherein at least one of the first and second surfaces in the bendable region is provided with a plurality of grooves extending at intervals,
    the grooves comprise a pair of outer grooves formed in the bendable region and a plurality of inner grooves formed inside the outer grooves, and
    an interval between each outer groove and a corresponding one of the inner grooves adjacent to each outer groove is greater than an interval between the inner grooves.

2. The vacuum insulation material according to claim 1, wherein the following equations are satisfied:

$$X\min=0.54Y$$

$$0<(a-5)=X\max \leq a/2,$$

where a minimum value and a maximum value of a groove width of the grooves are denoted by Xmin and Xmax, a groove depth of the grooves is denoted by Y, and the interval between the inner grooves is denoted by a.

3. The vacuum insulation material according to claim 2, wherein a ratio of the groove depth to a thickness of the vacuum insulation material is 6% to 14% per surface.

4. The vacuum insulation material according to claim 1, wherein the grooves are formed at both the first surface and the second surface, and
    the grooves formed at the second surface and the grooves formed at the first surface are opposite to each other.

5. The vacuum insulation material according to claim 1, wherein breaking elongation of the sheathing material in a first direction is different from that in a second direction which is perpendicular to the first direction, and
    the grooves extend perpendicularly to one of the first and second directions in which the breaking elongation is relatively small.

6. The vacuum insulation material according to claim 5, wherein the sheathing material comprises a laminate film comprising two or more polymer films having different orientations of constituents,
    the polymer films are formed by stacking one or more selected from among a mono-axially oriented film, a bi-axially oriented film, and a cast film, and
    a breaking elongation ratio in the direction in which the breaking elongation of the sheathing material is small is 40% to 150%.

7. The vacuum insulation material according to claim 1, further comprising:
    an adsorption sheet, containing an adsorbent, provided between the sheathing material and the core in a state in which the adsorption sheet is in tight contact with the sheathing material, wherein a portion of the core at which the grooves are formed is covered by the adsorption sheet.

8. The vacuum insulation material according to claim 7, wherein the adsorption sheet comprises a resin film having the adsorbent dispersed therein.

9. The vacuum insulation material according to claim 1, wherein one of the first and second surfaces of the vacuum insulation material at which the grooves are formed is bent along the grooves, and
   a space is defined in each groove such that corresponding portions of the sheathing material do not contact each other in a state in which the vacuum insulation material is bent.

10. The vacuum insulation material according to claim 1, wherein the grooves have a groove width of 1 mm to 10 mm,
    when a thickness of the vacuum insulation material is 6 mm, the grooves have a depth of 0.4 mm to 0.85 mm,
    an interval between adjacent outer and inner grooves is 6 mm to 50 mm, and
    an interval between the inner grooves is 6 mm to 20 mm.

11. An insulation case unit comprising:
    an outer case;
    an inner case received in the outer case; and
    a vacuum insulation material according to claim 1 disposed between the outer case and the inner case.

12. The insulation case unit according to claim 11, wherein the inner case has a curved region,
    the bendable region of the vacuum insulation material is bent in a state in which one of the first and second surfaces at which the grooves are formed is directed to the curved region, and
    the bendable region of the vacuum insulation material covers an outside of the curved region.

13. The insulation case unit according to claim 12, wherein sealed spaces are defined in the grooves facing the curved region in a state in which the vacuum insulation material is bent.

14. A refrigerator comprising:
    an insulation case unit according to claim 11; and
    a machinery compartment, in which a compressor is disposed, mounted outside the outer case,
    wherein at least a portion of the outer case is exposed outward,
    the inner case has a storage compartment defined therein, and
    the vacuum insulation material is disposed at least between the machinery compartment and the inner case along a shape of the inner case.

15. The refrigerator according to claim 14, further comprising:
    urethane foam filling a space between the inner case and the outer case excluding the vacuum insulation material,
    wherein the outer case and the inner case have openings formed at fronts thereof,
    the vacuum insulation material has a thickness of 5 mm to 10 mm,
    a minimum portion of the urethane foam has a thickness of 15 mm to 20 mm, and
    the vacuum insulation material covers the entirety of a portion of the inner case overlapping the machinery compartment when viewed from above.

16. A vacuum insulation material, comprising:
    a first surface;
    a second surface formed opposite to the first surface; and
    a core received between the first and second surfaces,
    wherein at least one of the first and second surfaces includes a bendable region provided with a plurality of grooves extending at intervals,
    the grooves comprise a pair of outer grooves formed in the bendable region and a plurality of inner grooves formed inside the outer grooves, and
    an interval between each outer groove and a corresponding one of the inner grooves adjacent to each outer groove is greater than an interval between the inner grooves.

* * * * *